(No Model.)  2 Sheets—Sheet 1.
J. G. BAKER.
VEGETABLE CUTTER.
No. 509,642. Patented Nov. 28, 1893.
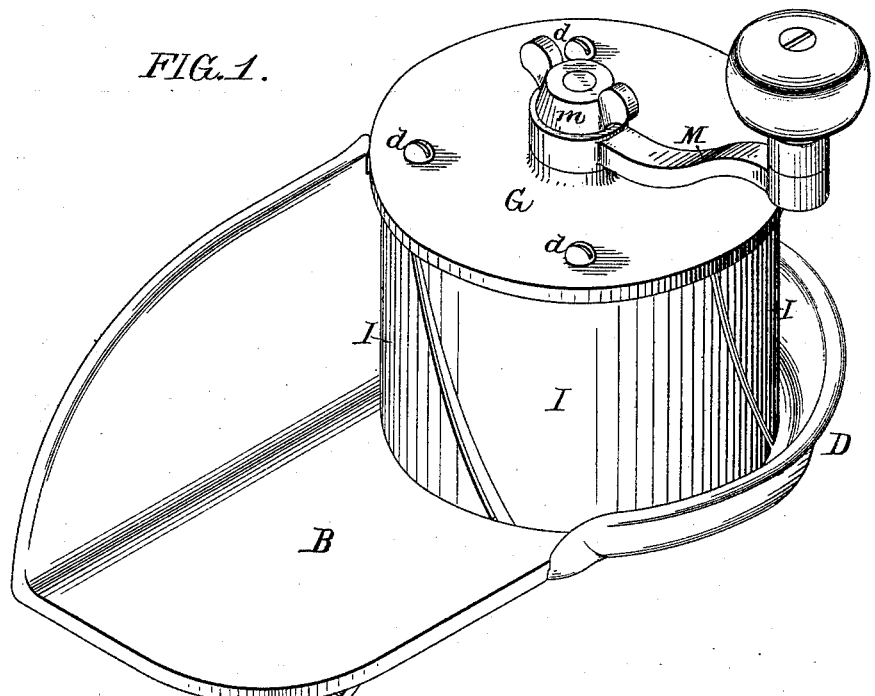
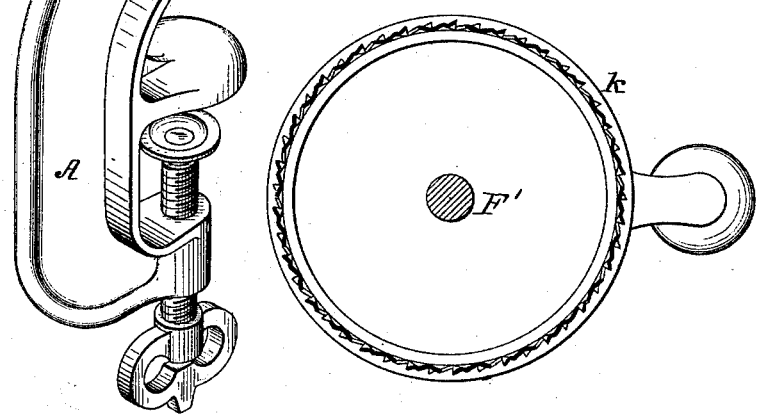
Witnesses:
William A. Barr
F. D. Goodwin
Inventor:
John G. Baker
by his Attorneys
Howson & Howson (No Model.) 2 Sheets—Sheet 2.
J. G. BAKER.
VEGETABLE CUTTER.
No. 509,642. Patented Nov. 28, 1893.
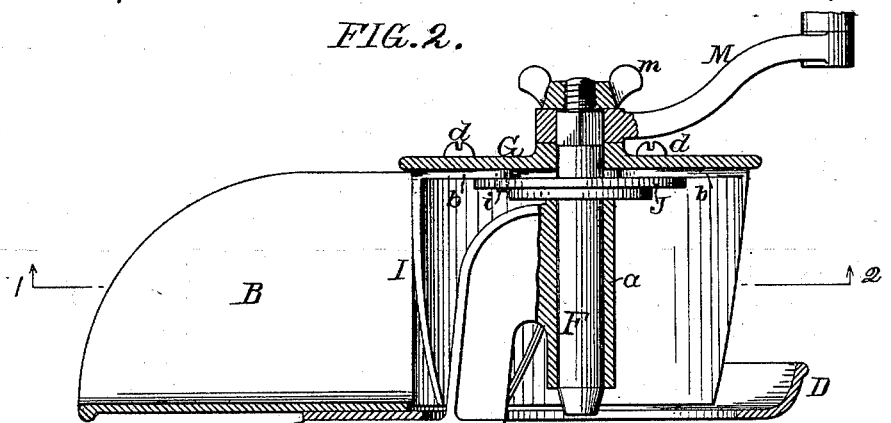
FIG. 2.
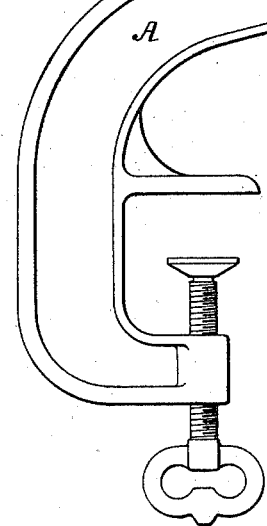
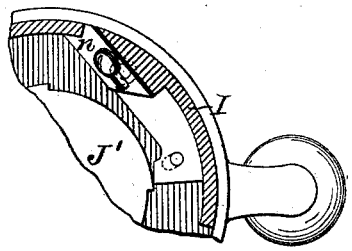
FIG. 4.
FIG. 3.
Witnesses:
William H. Barr
H. D. Goodwin
Inventor:
John G. Baker
by his Attorneys
Howson & Howson

UNITED STATES PATENT OFFICE.

JOHN G. BAKER, OF PHILADELPHIA, PENNSYLVANIA, ASSIGNOR TO THE ENTERPRISE MANUFACTURING COMPANY OF PENNSYLVANIA, OF SAME PLACE.

VEGETABLE-CUTTER.

SPECIFICATION forming part of Letters Patent No. 509,642, dated November 28, 1893.

Application filed July 17, 1893. Serial No. 480,693. (No model.)

*To all whom it may concern:*

Be it known that I, JOHN G. BAKER, a citizen of the United States, residing in Philadelphia, Pennsylvania, have invented certain Improvements in Vegetable-Cutters, of which the following is a specification.

The object of my invention is to so construct a vegetable cutter having a rotary knife carrier that the knives will operate with a shearing action, and can be readily adjusted to vary the depth of cut, the device, moreover, being cheaply and simply constructed and readily taken apart for cleansing purposes.

In the accompanying drawings:—Figure 1, is a perspective view of a vegetable cutter constructed in accordance with my invention. Fig. 2, is a vertical section of the same. Fig. 3, is an inverted sectional plan on the line 1—2, Fig. 2, with the supporting frame broken away. Fig. 4, is a view showing a modified form of cutter; and Fig. 5, is an inverted sectional plan view of a grating cylinder which can be substituted for the cutting cylinder.

A represents a bracket arm provided with a clamp whereby it may be attached to the edge of a table or other support, said bracket carrying a guide B and being provided with a guard rim D, as shown in Figs. 1 and 2. The upper end of the bracket forms a bearing $a$ for a vertical shaft or pin F and upon the upper end of the latter is mounted a disk G to which is secured a series of depending segments I, four of which are shown in the present instance, although there may be more or less than this if desired. Each segment has at the upper end an inwardly projecting flange $b$, a bolt $d$ passing through this flange and through the disk G and serving both to support the segment I and to pivot the same to the disk so that it can be swung thereon in order to cause its forward edge to project more or less beyond the rear edge of the preceding segment. The forward edge of each segment I is sharpened so as to act as a cutting knife, and is inclined in order to insure the shear cut necessary in order to properly slice cabbages or like vegetables, the pivot bolt $d$ being located at a point about midway of the extreme ends of each segment so that the differential movement of the front or cutting edge of each segment due to the inclination of the same is counterbalanced by a reverse differential movement of the rear edge of the preceding segment. Hence the extent of projection of each cutting edge beyond the preceding segment will be substantially uniform from top to bottom.

As a means of effecting the adjustment of all of the segments simultaneously I provide the shaft F with a disk J, which is fixed to the shaft and has a series of cam slots $f$ for the reception of pins $i$ projecting from tails on the flanges $b$. Hence by moving this cam to the right, the segments will be caused to swing in one direction, and by moving it to the left said segments will be caused to swing in the opposite direction, each segment being positively controlled so that the extent of projection of the knives and the consequent depth of cut can be very readily regulated.

A crank M is secured to the squared upper end of the shaft F by a nut $m$ and the hub of this crank bears upon the hub of the disk G, so that when the nut $m$ is tightened the crank and disk are secured together, but when the nut is slackened the crank can be turned independently of the disk, so as to effect the operation of the disk J and the adjustment of the cutting segments, the disk G being held so as to prevent its rotation while such adjustment is being effected.

The cuttings are directed by the knives to the interior of the open bottomed drum formed by the disk G and the series of segments I, and said cuttings drop from the drum into a receptacle located beneath it, the lateral scattering of any of these cuttings being prevented by the guard rim D which extends some distance above the bottom of the drum, as shown in Fig. 2.

The cutting drum with its shaft or pin can be readily lifted from the bearing $a$ of the bracket so that ready access to the interior of the drum at all times can be had for cleansing or other purposes.

Special cutting knives, such as shown for instance at $n$, Fig. 4, may be secured to the segments I, when it is not considered practicable or advisable to form the cutting knives by the segments themselves, and the cam disk may, if desired, be formed as shown at J' in said figure, so as only to project the segments I, the latter being pushed inward by hand, although, of course, the form of disk shown in Figs. 1 to 3 is preferred.

A drum K (Fig. 5) having perforations and projecting teeth, may be provided with a central spindle F', so as to be substituted for the cutting drum when the device is to be used as a grater.

Having thus described my invention, I claim and desire to secure by Letters Patent—

1. The combination in a vegetable cutter, of a guide trough, a rotary cutting drum consisting of a disk having depending cutting segments with flanges pivoted to said disk and having tails with projecting pins, a driving spindle passing through said disk and having a cam disk with slots for receiving said pins, a polygonal portion and a threaded portion beyond the same, a bearing within the drum for the depending spindle, an operating handle adapted to the polygonal portion of the spindle above the disk of the cutting drum, and a nut adapted to the threaded portion of said spindle and serving to confine the handle and to cause the clamping of the tails of the segment flanges between the disk of the drum and the slotted cam disk of the spindle, substantially as specified.

2. The combination in a vegetable cutter, of a guide trough and a rotating drum consisting of a disk with segments pivoted thereto and having inclined cutting knives at the front edges and correspondingly inclined guard edges at the rear, substantially as specified.

3. The combination in a vegetable cutter, of a guide trough, with a cutting drum consisting of a disk, a series of segments pivoted thereto, and each having an inclined cutting knife at the front, and an inclined guard edge at the rear, and a cam for simultaneously adjusting said segments, substantially as specified.

4. The combination in a vegetable cutter, of a guide trough with a cutting drum having a series of pivoted segments each of which has an inclined front edge sharpened to form a cutting knife, and a correspondingly inclined rear edge serving as a guard for the cutting edge of the next segment, substantially as specified.

5. The combination in a vegetable cutter, of the guide trough, with a cutting drum consisting of a disk, a series of segments pivoted thereto, and each having an inclined cutting knife at the front, and a correspondingly inclined guard edge at the rear, a pin projecting from each of said segments, and a slotted cam engaging with said pins and adapted to move the segments positively in either direction, substantially as specified.

6. The combination in a vegetable cutter, of the guide trough and a cutting drum consisting of a disk, a support on which the same can be rotated, and a series of depending segments each pivoted to the disk and having an inclined front cutting knife, and a corresponding inclined rear guard edge, substantially as specified.

7. The combination in a vegetable cutter, of the guide trough, and a cutting drum consisting of a disk with depending segments having inclined front cutting knives and correspondingly inclined rear guard edges, and a central depending spindle, with a bearing in which said spindle is free to rotate, the bottom of the drum being open for the discharge of the cuttings therefrom, substantially as specified.

8. The combination in a vegetable cutter, of the feed trough, the open bottomed drum having depending segments forming the cutters, a central depending spindle a bearing for said spindle, a laterally projecting feed trough and a guard rim surrounding and projecting above the bottom of the drum, substantially as specified.

In testimony whereof I have signed my name to this specification in the presence of two subscribing witnesses.

JOHN G. BAKER.

Witnesses:
FRANK E. BECHTOLD,
JOSEPH H. KLEIN.